United States Patent
Tetrick

(10) Patent No.: US 6,598,199 B2
(45) Date of Patent: Jul. 22, 2003

(54) MEMORY ARRAY ORGANIZATION

(75) Inventor: Raymond S. Tetrick, Portland, OR (US)

(73) Assignee: Intel Corporation, Santa Clara, CA (US)

(*) Notice: Subject to any disclaimer, the term of this patent is extended or adjusted under 35 U.S.C. 154(b) by 22 days.

(21) Appl. No.: 09/752,519

(22) Filed: Jan. 3, 2001

(65) Prior Publication Data

US 2001/0001158 A1 May 10, 2001

Related U.S. Application Data

(63) Continuation of application No. 09/223,184, filed on Dec. 30, 1998, now abandoned.

(51) Int. Cl.[7] .............................................. G11C 29/00
(52) U.S. Cl. ........................ 714/766; 714/767; 714/769; 714/774
(58) Field of Search ........................ 711/154; 714/762, 714/766, 6, 12, 52, 48, 733, 767, 769, 774; 707/206; 710/61, 130; 712/225, 35

(56) References Cited

U.S. PATENT DOCUMENTS

| | | | | |
|---|---|---|---|---|
| 4,796,222 A | * | 1/1989 | Aichelmann, Jr. et al. .. | 711/154 |
| 4,993,028 A | * | 2/1991 | Hillis .......................... | 714/762 |
| 5,056,095 A | | 10/1991 | Horiguchi et al. | |
| 5,345,565 A | * | 9/1994 | Jibbe et al. .................. | 710/130 |
| 5,424,989 A | | 6/1995 | Hagiwara et al. ........... | 365/201 |
| 5,457,703 A | | 10/1995 | Kakuta et al. | |
| 5,463,643 A | * | 10/1995 | Gaskins et al. .............. | 714/766 |
| 5,490,248 A | | 2/1996 | Dan et al. ............... | 395/182.04 |
| 5,539,875 A | * | 7/1996 | Bishop et al. ................. | 714/12 |
| 5,584,034 A | * | 12/1996 | Usami et al. .................. | 712/35 |
| 5,680,539 A | * | 10/1997 | Jones ............................. | 714/6 |
| 5,745,671 A | * | 4/1998 | Hodges .......................... | 714/6 |
| 5,761,222 A | * | 6/1998 | Baldi .......................... | 714/773 |
| 5,799,324 A | * | 8/1998 | McNutt et al. ............. | 707/206 |
| 6,003,121 A | | 12/1999 | Wirt ............................ | 711/170 |
| 6,018,778 A | * | 1/2000 | Stolowitz ..................... | 710/61 |
| 6,061,263 A | | 5/2000 | Boaz et al. .................... | 365/51 |
| 6,119,248 A | * | 9/2000 | Merkin ......................... | 714/52 |
| 6,141,747 A | * | 10/2000 | Witt ............................ | 712/225 |
| 6,158,025 A | * | 12/2000 | Brisse et al. ................. | 714/48 |

OTHER PUBLICATIONS

"Rambus Tackles High–end Systems", *Electronic News*, Aug. 6, 1999, p. 6.
"Rambus in High Availability Systems" (5 pages), Rambus, Aug. 1999.
"Rambus®: Protecting High–Availability Systems" (3 pages), Rambus, Feb. 2000.

* cited by examiner

*Primary Examiner*—David Ton
(74) *Attorney, Agent, or Firm*—Antonelli, Terry, Stout & Kraus, LLP

(57) ABSTRACT

The memory array of a server device organizes conventional desktop memory so as to be able to perform error correction. Each one of several Rambus Direct Random Access Memory ("RDRAM™") devices transfers one group of bits of a data word across a corresponding channel. An additional RDRAM™ device transfers data used for performing error correction, including chip kill, for on the data stored in the RDRAM™ devices.

16 Claims, 4 Drawing Sheets

MEMORY ARRAY ORGANIZATION

CROSS-REFERENCE TO RELATED APPLICATION

This application is a Continuation application of Ser. No. 09/233,184, filed Dec. 30, 1998, now abandoned.

BACKGROUND

1. Field

This invention relates generally to memory arrays. In particular, the present invention relates to the organization of a memory array with error correction.

2. Description

Server devices in a network typically have more stringent memory processing characteristics than desktop personal computers. In particular, it is desireable that servers reliably store a great deal of information and quickly distribute that information in response to requests from other devices in the network. There are numerous transactions, such as for bank accounts, etc., in which it is desireable that the data be correctly stored and that an error be covered or corrected as software is running. For example, if the data is a credit card account number, corruption of the data could result in the wrong account being charged, etc. Consequently, server devices should be able to either: correct erroneous data stored in its memory and continue processing or, if the data cannot be corrected, stop the transaction and provide an error notice.

Corruption sometimes occurs in the storage medium of the memory itself. Therefore, servers typically have error correction capability support for the stored data in the memory interface. This error correction may include, for example, Single Bit Correct/Double Bit Detect ("SBCDBD") and Double Bit Correct/Triple Bit Detect ("DBCTBD"). Some server memory arrays also have a "chip kill" feature—the ability to detect the complete or substantial failure of a single memory device in the array.

Some dynamic random access memory ("DRAM") arrays in servers are specifically designed to use error correction codes ("ECC"), which are additional memory bits stored along with the data, to detect and correct errors of the data stored in the memory. Full error correction codes employ at least one or two extra bits for each 8-bit byte of data. ECC memories in server devices storing 16-bit data frequently have 3 additional bits used for error correction.

Some memory arrays specifically designed for these servers use 72 bit data words (to provide eight additional bits for error correction) instead of the 64 bit data path width of the standard memory and memory interface used in desktop systems without any error detection circuitry. But such specialized memory arrays are less available and higher in cost than the standard desktop memory.

Furthermore, some memory devices such as RDRAM™ brand dynamic random access memory (available from Rambus, Inc., of Mountain View, Calif.) transfer data over a narrow data path having less bits than the data words transferred into and out of the processor. These narrow data path memory devices are more expensive and do not easily accomodate the full error correction desired in some environments such as in servers. Consequently, it is desireable to devise a manner of organizing such narrow data path memory devices to accomodate full error correction.

SUMMARY

The present invention is directed to a method of organizing memory devices into a memory array having error correction. In a first aspect, a memory array has Rambus Direct Random Access Memories (RDRAM™s) coupled to respective first RDRAM™ channels, at least one of which stores and transfers a respective mutually exclusive group of the bits of a data word over its respective first RDRAM™ channel in parallel with the other first RDRAM™s. There is also a second RDRAM™ coupled to a respective second RDRAM™ channel, the second RDRAM™ storing and transferring error correction data used in detecting and correcting errors in the data stored in the first RDRAM™s.

DETAILED DESCRIPTION

An example application of the invention is in the memory array of a server device storing and transferring error sensitive data. In particular, the example embodiments of the invention seek to utilize and organize widely available desktop memory devices into a memory array in such a manner so as to facilitate error correction and thereby make such devices suitable for use as the building blocks of a memory array in a server. The example embodiment of the invention is implemented with RDRAM™ memory from Rambus, Inc. of Mountain View, Calif. However, the invention may of course receive application in memory intensive devices other than servers.

Figure 1:
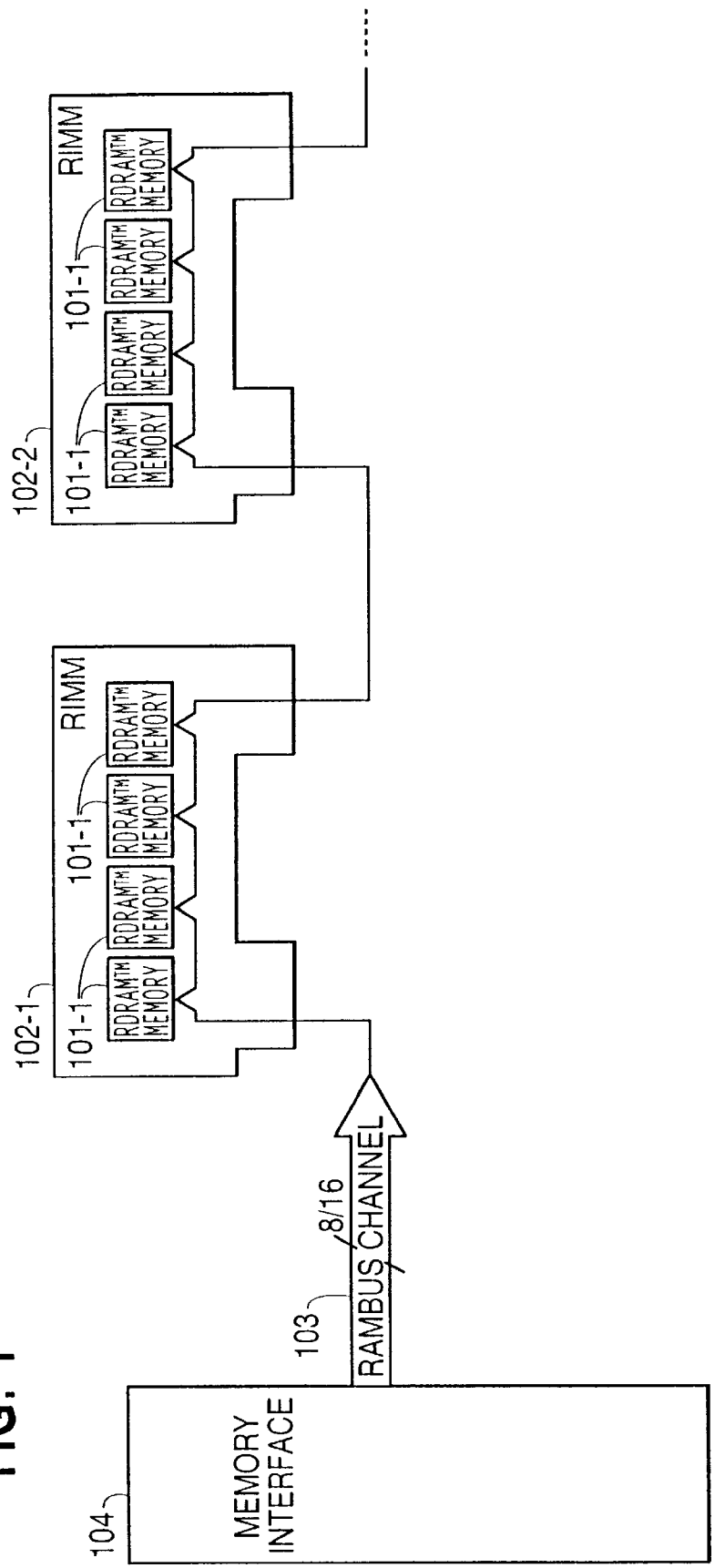
FIG. 1 is a generalized block diagram providing a basic illustration of RDRAM™ installation in a computer device.

FIG. 1 illustrates an example installation of RDRAM™ memories. As shown, they may be mounted on a number of Rambus In-line Memory Module ("RIMM") packaging units 101-1, 101-2, etc, which are electrically coupled in daisy chain fashion to memory interface 104 via Rambus channel 103. RIMMs 101 are substantially similar to DIMMs except, of course, that they have RDRAM™ memories 102-1, 102-2, etc., rather than DRAMs, and also have different sizes. Each RIMM 102 has two connectors instead of one, so that they can be coupled in sequence in daisy chain fashion as shown in FIG. 1. There are electrical performance advantages to such an arrangement. But another advantage is that the size of the memory array can be easily changed by just adding or deleting a memory component.

While the architecture shown in FIG. 1 makes it easy to expand capacity by adding another RDRAM™ memory to the daisy chain, the Rambus channel for each daisy chain in this embodiment is restricted to an 8-bit or 16-bit data word (9 or 18 bits if a parity bit is used)—making it unsuitable for server devices which employ a larger data word to accommodate strong error correction. The parity bits in 9-bit and 18-bit RDRAM™ memories are insufficient to support error correction codes sometimes desired for servers. In Double Bit Correct/Triple Bit Detect ("DBCTBD") code, if any two parity bits fail or any two bits fail, the data is corrected before it is transferred out of the memory device. Also, if one of the memory devices fails entirely, error correction with chip kill can detect the failure and sometimes continue running the memory device in some degraded mode. Potentially, error correction can also be performed upon the detection of three or more failed bits ("triple bit correct"). Error correction frequently involves review of successive parity bits. But of course, the error code supported may be any presently available or later developed error code.

The example embodiments arrange the basic units of RDRAM™ memory to allow for strong error correcting capabilities. Such ECC support for 16 bit data words employs three additional bits. Such ECC support for 64 bits employs 8 additional bits. This strong error correction and data reliability cannot be accomplished using the limited data path widths of RDRAM™ memories and Rambus channels in a conventional desktop memory configuration.

Figure 2:
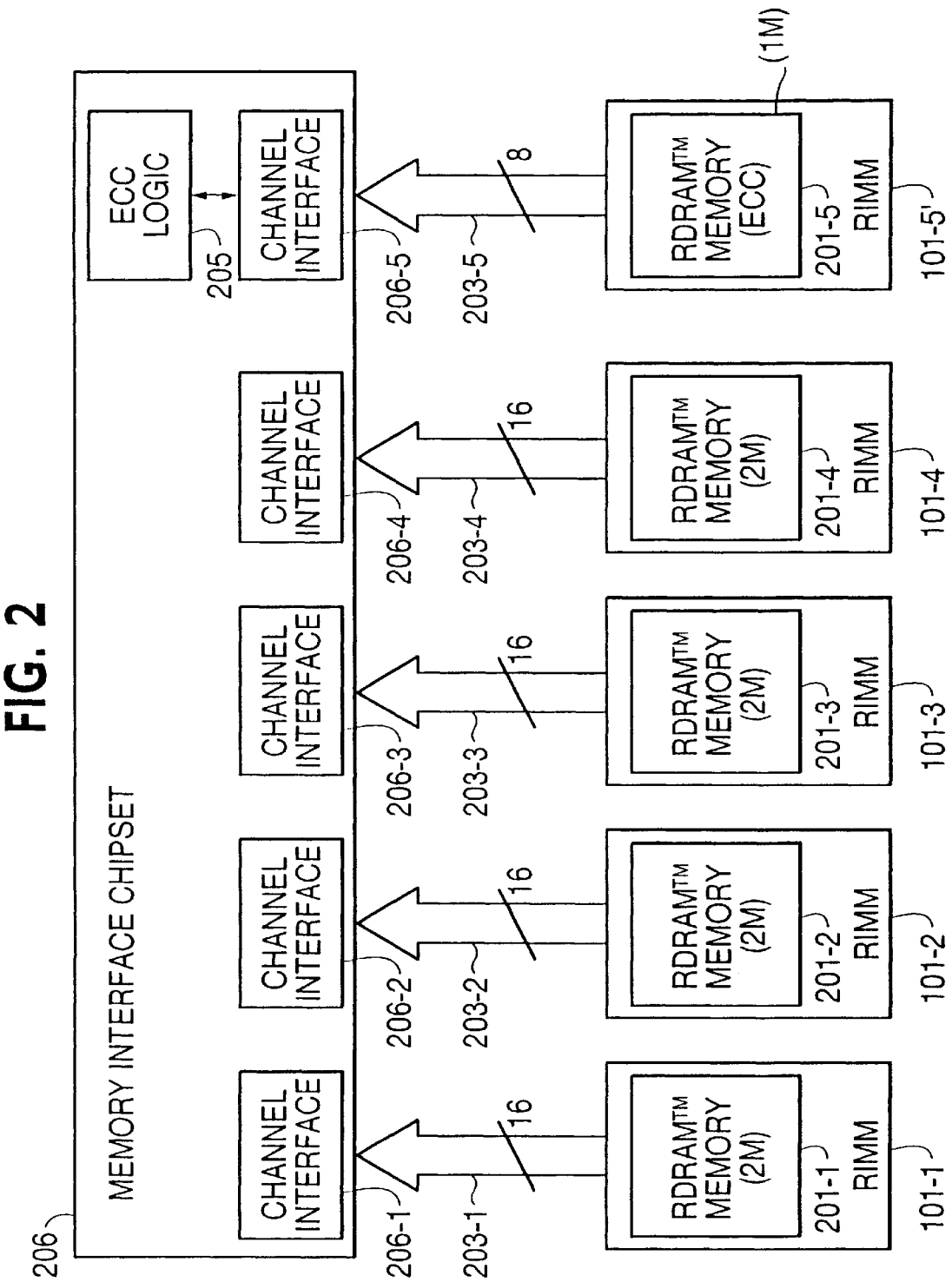
FIG. 2 is a block diagram illustrating the memory array arrangement of a server according to a first example embodiment of the invention.

A block diagram of a first example embodiment of a memory array in a server according to the invention is shown in FIG. 2. The example array has four RDRAM™ memories 201-1 to 201-4 (each RDRAM™ memory 201-1 to 201-4 may be made up of several devices as shown in FIG. 1 but are referred to in the singular for convenience) on respective RIMMS 101-1 to 101-4, each RDRAM™ having a 16-bit data path and coupled to memory interface chipset 206 via respective Rambus channels 203-1 to 203-4 and channel interfaces 206-1 to 206-4. The RDRAM™ memories 201-1 to 201-4 and RIMMs 101-1 to 101-4 need not have 16-bit data paths. The data path widths could be 8 bits, for example.

RIMMs 101-1 to 101-4 all have the same capacity in this embodiment and are driven by the same clock and control signals such that RDRAM™ memory 201-1 to 201-4 each transfer a respective 16 bits of a 64 bit data word in parallel. Collectively, RDRAM™ memories 201-1 to 201-4 transfer 64 bits of a data word in parallel.

In addition, 8 more bits are stored and transferred by RDRAM™ 201-5 on RIMM 101-5' via channel interface 206-5 in memory interface chipset 206 and Rambus channel 203-5 for a total of 72 bits. Memory interface chipset 206 has five separate respective channel interfaces 206-1 to 206-5, one for each Rambus channel 203-1 to 203-5. Channel interface for Rambus channel 203-5 is coupled to ECC logic 205 and provides internal ECC support. As part of each Rambus channel 203-1 to 203-5, identification (ID) bits indicate the data path width and size of RDRAM™s 201-1 to 201-5. The data path width of RDRAM™ 201-5, RIMM 101-5' and Rambus channel 203-5 is one half of the width of the data path for RDRAM™s 201-1 to 201-4, RIMMs 101-1 to 101-4 and Rambus channels 203-1 to 203-4. Correspondingly, the capacity of RDRAM™ 201-5 is one half the capacity of each of RDRAM™s 201-1 to 201-4. For purposes of illustrating the relationship only, RDRAM™ memories 201-1 to 201-4 are each shown as having a 2 megabyte (2 M) capacity and RDRAM™ memory 201-5 is shown as having a 1 megabyte (1 M) capacity. The memories may, of course, have any capacity so long as, for this embodiment, the relationship is maintained between RDRAM™ memory 201-5 and RDRAM™ memories 201-1 to 201-4.

The 8 additional bits from RDRAM™ 201-5 are dedicated to error detection and correction. The memory interface chipset 206 decides and controls what data is read, written and corrected with the memory array as known in the art. It also generates the proper error correction code data to be stored in ECC RDRAM™ 201-5.

Each pair of ECC bits stored and transferred by ECC RDRAM™ 201-5 corresponds to sixteen of the bits in the 64-bit data word stored and transferred by RDRAM™s 201-1 to 201-4. However, the sixteen bits corresponding to the pair of ECC bits are not stored and transferred by any single one of RIMMs 101-1 to 101-4. Instead, the sixteen bits are spread out among RIMMs 101-1 to 101-4.

Figure 3:
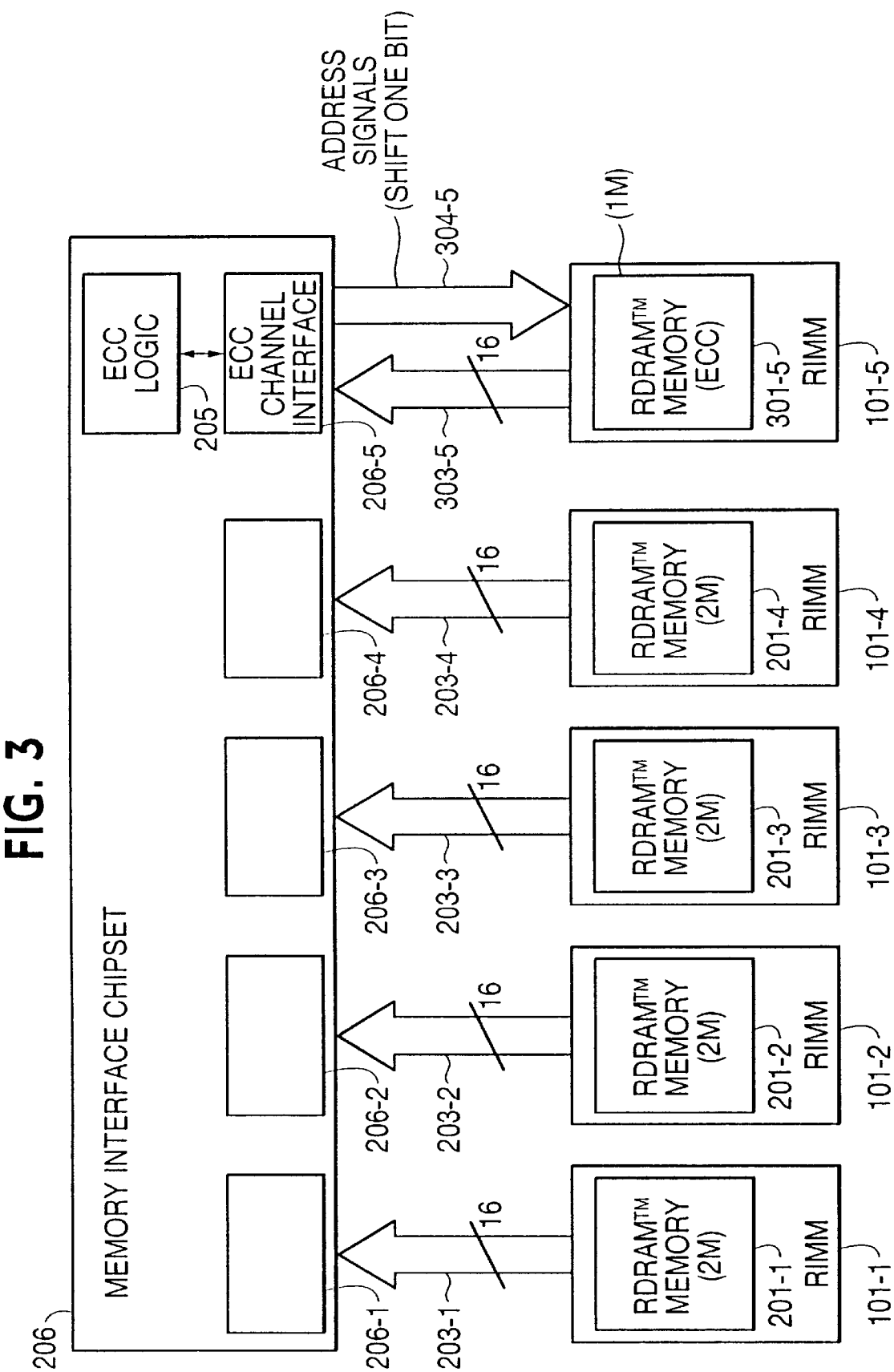
FIG. 3 is a block diagram illustrating the memory array arrangement of a server according to a second example embodiment of the invention.

Alternatively, in a second example embodiment shown in FIG. 3, ECC RDRAM™ 301-5, RIMM 101-5 and Rambus channel 303-5 could each have a sixteen bit data path and ECC RDRAM™ 301-5 could have a capacity which is one-half that of each of RDRAM™s 201-1 to 201-4. For example, if the capacity of each of RDRAM™s 201-1 to 201-4 is 1 megabyte, then the capacity of RDRAM™ 301-5 is ½ megabyte. Such a relationship of RDRAM™ capacity could easily be accomplished by the appropriate selection of the number of memory devices on each respective RIMM as discussed above with respect to FIG. 1.

In the second example embodiment, either one of the upper eight bits or lower eight bits of the 16 bits stored and transferred in ECC RDRAM™ 301-5 is arbitrarily accessed by different addressing from memory interface chipset 206 via address signal lines 304-5. This address shifting of one bit permits a similar advantage of the first example embodiment. However, it allows the server memory to made up entirely of RDRAM™, RIMM and Rambus channel components of one single data path width so that a server memory may be built with only one data path width in inventory. As in the first example embodiment, in this embodiment, a server memory array with strong error correction is organized from RDRAM™s not intended to be able to support such strong error correction.

Figure 4:
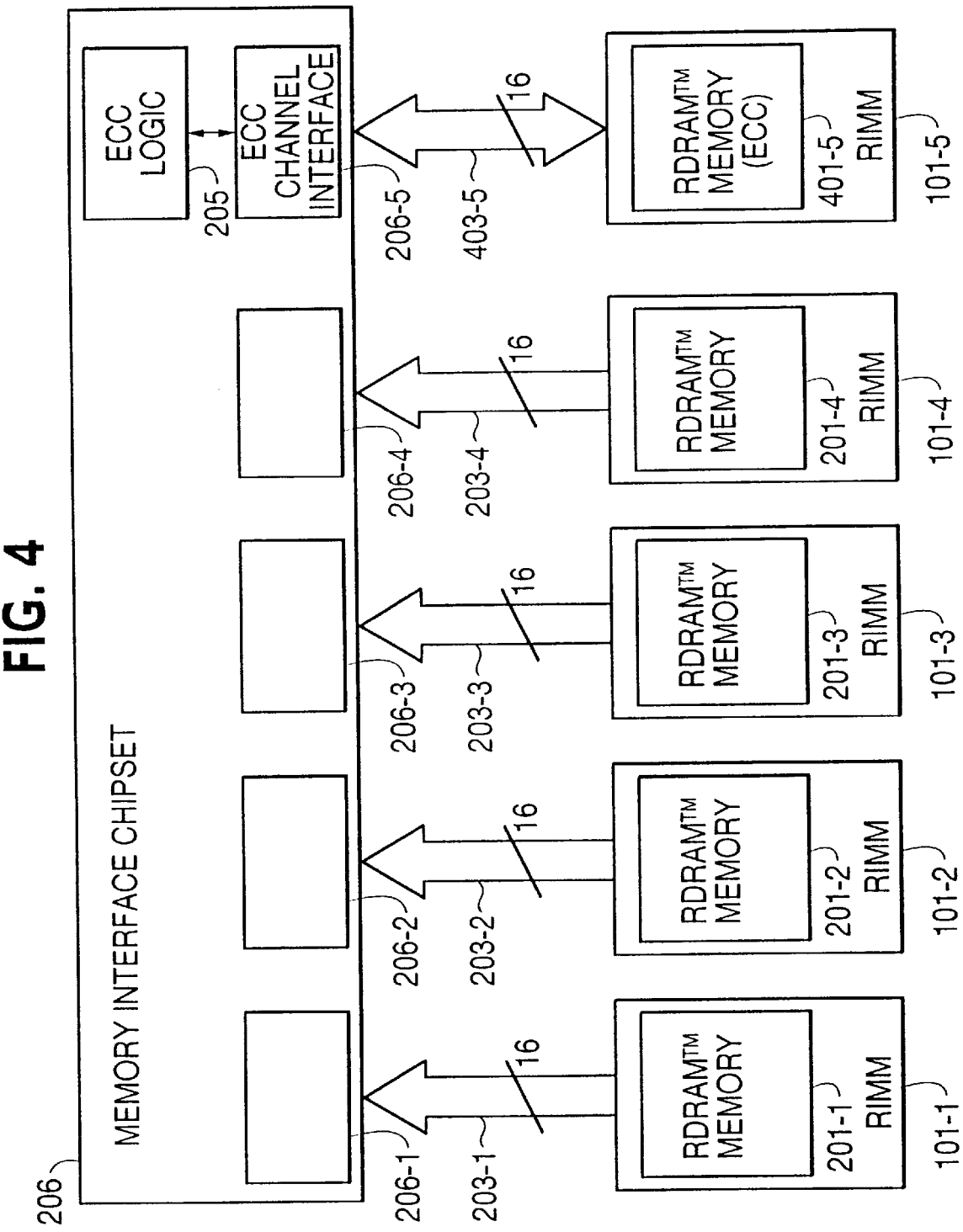
FIG. 4 is a block diagram illustrating the memory array arrangement of a server according to a third example embodiment of the invention.

A third example embodiment is shown in FIG. 4. This embodiment extends the error detection and correction capability of the first two example embodiments to include DBCTBD and chip kill.

The third example embodiment differs from the first example embodiment insofar as RDRAM™ 401-5, RIMM 101-5 and Rambus channel 403-5 have a 16-bit data path width as RDRAM™s 201-1 to 201-4, RIMMs 101-1 to 101-4 and Rambus channels 203-1 to 203-4. RDRAM™ 401-5 has the capacity of RDRAM™s 201-1 to 201-4. RDRAM™ 401-5 stores and transfers 16 bits of error correction data. It supports double bit correct and triple bit detect chip kill, with proper encoding, in conjunction with memory interface chipset 206.

Of course, the third example embodiment also is not limited to 16 bit data path widths and RIMMS 101-1 to 101-5 may contain any amount of memory capacity. Other error correction schemes which access memory devices and save some portion of the memories for ECC data may increase the amount of memory that is employed.

One of the advantages of the example embodiments is that one RIMM can be designated and reserved for error correction regardless of the capacity of the memory array. Another advantage is that, since all three example embodiments of the invention utilize a fifth Rambus channel, the same identical memory interface chipset 206 could be used to support ECC correction in all three of the example embodiments as well as other embodiments. In this way, either simple single bit error correction or complicated, more expensive, multi-bit correction could be supported with the same or a similar memory interface chipset and memory organization.

An advantage of the example embodiment comes from the use of RDRAM™ memory devices. While these devices have high performance, the Rambus channel interconnect technology for the devices can only have 8, 9, 16 or 18 bits.

The example embodiments according to the invention allow a memory array to utilize Rambus devices of 8-bit widths or 16-bit widths to obtain the high performance characteristics thereof and still support strong error correction.

Of course, the example embodiments of the invention are not limited to personal computers. Indeed, the invention is particularly useful for any computing device employing the high memory performance of Rambus and strong error correction. The invention may be used in any device in which a high degree of data storage reliability is desired.

Other features of the invention may be apparent to those skilled in the art from the detailed description of the exemplary embodiments and claims when read in connection with the accompanying drawings. While the foregoing and following written and illustrated disclosure focuses on disclosing exemplary embodiments of the invention, it should be understood that the same is by way of illustration and example only, is not to be taken by way of limitation and may be modified in learned practice of the invention. While the foregoing has described what are considered to be exemplary embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A server device comprising:
a memory array having:
    a plurality of first narrow data path memory devices coupled to respective first narrow data path channels, at least one of the plurality of first narrow data path memory devices storing and transferring a respective mutually exclusive group of the bits of a data word over its respective first narrow data path channel in parallel with the other first narrow data path memory devices; and
    a second narrow data path memory device coupled to a respective second narrow data path channel, said second narrow data path memory device storing and transferring error correction data used in detecting and correcting errors in the data stored in said plurality of first narrow data path memory devices; and
    a memory interface chipset, said memory interface chipset generating the error correction data and controlling the transfer of data to and from said first narrow data path memory devices and the transfer of error correction data to and from said second narrow data path memory device.

2. A server device as recited in claim 1, said memory interface chipset having channel interfaces respectively coupled to said first narrow data path memory devices and an ECC channel interface coupled to said second narrow data path memory device.

3. A server device as recited in claim 2, said memory interface chipset having ECC logic coupled to said ECC channel interface.

4. The memory array recited in claim 1, wherein each of said first narrow data path memory device is adapted to store and transfer a mutually exclusive group of bits.

5. The memory array recited in claim 4, wherein said plurality of first narrow data path memory devices comprises four narrow data path memory devices and said data word is comprised of four times that of each mutually exclusive group of bits.

6. The memory array recited in claim 1, wherein the narrow data path memory devices comprise Rambus In-line Memory Modules (RIMMs) having a plurality of Rambus Direct Random Access Memories (RDRAMs).

7. The memory array recited in claim 6, wherein the second RDRAM is one-half the size of the first RDRAMs.

8. The memory array recited in claim 7, wherein the data path width of the second RDRAM is one-half the data path width of the first RDRAM.

9. The memory array recited in claim 7, wherein the data path width of the second RDRAM is the same as the data path width of the first RDRAM.

10. The memory array recited in claim 9, wherein the addressing of the second RDRAM is shifted by one bit to arbitrarily transfer either the upper bits or the lower bits of the data word.

11. A method of performing error correction in a memory, said method comprising:
    transferring only data wards of a predetermined width to and from a plurality of narrow data path memory devices through respective first narrow data path channels, a mutually exclusive group of the bits of the data wards being transferred and stored in a respectively corresponding one of the plurality of first narrow data path memory devices in parallel with the other first narrow data path memory devices;
    transferring only error correction data to a second narrow data path memory device through a respective second narrow data path channel; and
    detecting and correcting errors in the data stored in said plurality of first narrow data path memory devices using only said error correction data stored in said second narrow data path memory device and a memory interface chipset performing the error correction method.

12. The memory interface chipset recited in claim 11, wherein the memory interface chipset generates the error correction code data stored in said second narrow data path memory device.

13. The memory interface chipset recited in claim 12, wherein the memory interface chipset supports a plurality of different error correction schemes.

14. A memory array comprising:
    a plurality of narrow data path memory devices coupled to respective first narrow data path channels, at least one of the plurality of first narrow data path memory devices storing and transferring only a respective mutually exclusive group of the bits of a data word over its respective first narrow data path channel in parallel with the other first narrow data path memory devices; and
    a second narrow data path memory device coupled to a respective second narrow data path channel, said second narrow data path memory device storing and transferring only error correction data used in detecting and correcting errors in the data stored in said plurality of first narrow data path memory devices; and
    a memory interface chipset to said first narrow data path channels and said second narrow data path channel, said memory interface chipset generating said error correction data.

15. The memory array recited in claim 14, wherein the width of said data word is a multiple of the number of bits in each mutually exclusive group of bits.

16. A method of performing error correction in a memory, said method comprising:

transferring only data words of a predetermined width to and from a plurality of narrow data path memory devices through respective first narrow data path channels, a mutually exclusive group of the bits of the data words being transferred and stored in a respectively corresponding one of the plurality of first narrow data path memory devices in parallel with the other first narrow data path memory devices;

generating error correction data for said data in a memory interface chipset;

transferring only said error correction data to a second narrow data path memory device through a respective second narrow data path channel; and detecting and correcting errors in the data stored in said plurality of first narrow data path memory devices using only said error correction data stored in said second narrow data path memory device.

\* \* \* \* \*